United States Patent [19]
Haus, Jr.

[11] 3,765,240
[45] Oct. 16, 1973

[54] METHOD AND APPARATUS FOR DETECTING OIL LEAKS IN CABLES

[75] Inventor: Paul Z. Haus, Jr., Bergen, N.J.

[73] Assignee: Consolidated Edison Company of New York, Inc., New York, N.Y.

[22] Filed: Aug. 27, 1971

[21] Appl. No.: 175,459

[52] U.S. Cl. ................................. 73/204, 73/40
[51] Int. Cl. ............................................. G01f 1/00
[58] Field of Search ................................... 73/204

[56] References Cited
UNITED STATES PATENTS

| | | | |
|---|---|---|---|
| 2,647,401 | 8/1953 | Hathaway | 73/204 |
| 3,500,686 | 3/1970 | Bell | 73/204 |
| 3,592,055 | 7/1971 | Dorman | 73/204 |
| 3,623,364 | 11/1971 | Withrow | 73/204 |
| 3,335,606 | 8/1967 | Scarpa | 73/204 |

OTHER PUBLICATIONS

Wingo, Measurement of Low Velocities in Liquids, DP 287 AEC Research & Development Report, E. I. Dupont de Nemours Co., Pages 8, 9, 13, 14 & 16.

Primary Examiner—S. Clement Swisher
Attorney—Lorimer P. Brooks et al.

[57] ABSTRACT

Method and apparatus for locating a leak in a conduit filled with oil under pressure in which the oil is locally heated and the temperature on opposite sides of the heated portion is measured to determine the temperature difference, the side having the higher temperature indicating the direction of oil flow, and hence the direction of the leak, with respect to the heated portion. The apparatus comprises an electric heating element and at least one temperature responsive resistor mounted on an elongated probe which can be inserted into the interior of the conduit through an opening therein, a battery for energizing the heating element and a Wheatstone bridge for measuring the resistance of the temperature responsive resistor or resistors.

9 Claims, 4 Drawing Figures

METHOD AND APPARATUS FOR DETECTING OIL LEAKS IN CABLES

This invention relates to methods and apparatus for the detection of the location of oil leaks in oil carrying conduits and particularly high pressure pipe type electrical cables.

Oil-filled electrical power cables are in use today, and normally, such cables are installed underground with access thereto only at relatively widely spaced manholes. In recent years, many of such cables have been used with the oil under relatively high pressure, and even with a relatively small leak, substantial volumes of oil are lost therethrough. Although a cable may not lose oil by leaking when initially installed, over a period of time leaks do occur, and the first indication thereof usually is the operation of an alarm at the oil pumping station indicating a low oil level.

Prior to the operation of such alarm, a substantial amount of expensive oil is lost, and the rate of leaking is determined roughly by adding oil to the oil supply tank and measuring the loss over a 24-hour period. If there is a sufficiently serious loss of oil, the cable is taken out of service with an accompanying disruption of service.

In the past, one of the principle methods of determining the location of the leak was by visual inspection of the area adajcent the cable run. Thus, each relevant manhole, adjacent sewers and the surface of the ground above the cable are inspected for the presence of oil. However, unless the leak is at a manhole, the leak usually cannot be detected until many gallons of oil are lost.

If the leak cannot be found by such visual inspection, the path of the cable is marked out, and holes are made in the ground at spaced intervals along such path in the hope of finding oil in the earth, which indicates the location of the leak. If this is unsuccessful, the oil at a portion of the cable in a manhole is frozen. A pressure drop test is then performed on the section between manholes, and if there is a pressure drop, then the leak is between such manholes. If not, the procedure is repeated at different manholes until the leaking section is found. After the leaking section is found, an excavation is made about mid-way between manholes, and the oil in the portion of the exposed cable is frozen. A pressure drop test is then performed on each half of the cable, and the half having a pressure drop contains the leak. The procedure is repeated for the leaking section until the leak is located.

Such procedure is slow and expensive and causes inconvenience to the public by reason of the hole digging, etc., the cable run often being under the surface of a street. In addition, the digging of holes and excavation can cause damage to the cable unless great care is taken.

In most such cable installations there is a valve attached to the cable casing at each, or many, manholes through which access to the interior of the cable can be obtained. The present invention permits the determination of the leaking cable section by means of such a valve or a similar cable casing access opening, and thereby avoids the necessity of extensive visual inspection and the use of freezing techniques to find the leaking section. After the leaking section is located, the exact location of the leak is determined by concentration of effort on such section using known techniques.

Accordingly, substantial time and expense is saved, and in addition, since the apparatus of the invention can detect relatively slow leaks, the location of a leaking section can be determined before there is a substantial loss of oil.

In accordance with the invention, the oil at a predetermined portion of the interior of the cable casing is heated above its normal temperature and the temperature of the oil at opposite sides of such portion lengthwise of the cable is measured. If there were no oil flow, the temperature would be substantially the same on both sides of the heated portion, but if there is a temperature difference, the side having the higher temperature is in the direction of oil flow and hence, indicates the direction of the leak. Preferably, the heating and temperature measurement is performed interiorly of the cable through an access opening already available in the cable joint casing or pipe, but if the much lower sensitivity can be tolerated, e.g., if the leak is large, the heating and temperature measurement can be performed on the exterior of the pipe, the sensitivity being less due to the pipe conductivity and mass.

The preferred form of the apparatus of the invention comprises a small electric heater and at least one temperature responsive resistor, such as a thermistor, mounted at one side of and spaced from the heater, both the heater and the resistor being mounted on a probe which can be inserted through an opening in the joint casing or pipe. The resistor is connected in a resistance measuring circuit, such as a Wheatstone bridge, to measure the resistance change of the resistor as it is moved from one side of the heater to the other.

In an alternate form of the apparatus of the invention, a pair of temperature sensitive resistors are mounted adjacent but spaced from the heater, one on each side thereof, and the difference between the resistance values thereof is measured to determine the temperature difference and hence, the direction of oil flow and the oil leak.

One object of the invention is to simplify and expedite the determination of the section of a high pressure, oil-filled pipe type cable which is leaking.

Another object of the invention is to permit the detection of relatively slow oil flow in an oil-filled cable.

These and other objects of the invention will be apparent from the following detailed description of preferred embodiments thereof, which description should be considered in conjunction with the accompanying drawings in which:

FIG. 3 is an enlarged, fragmentary view, partly in cross-section, of a portion of the probe shown in FIGS. 1 and 2; and FIG. 4 is a circuit diagram of the preferred form of the electrical circuit employed for measuring the resistance of the temperature sensitive resistor or resistors forming part of the apparatus of the invention.

Figure 1:
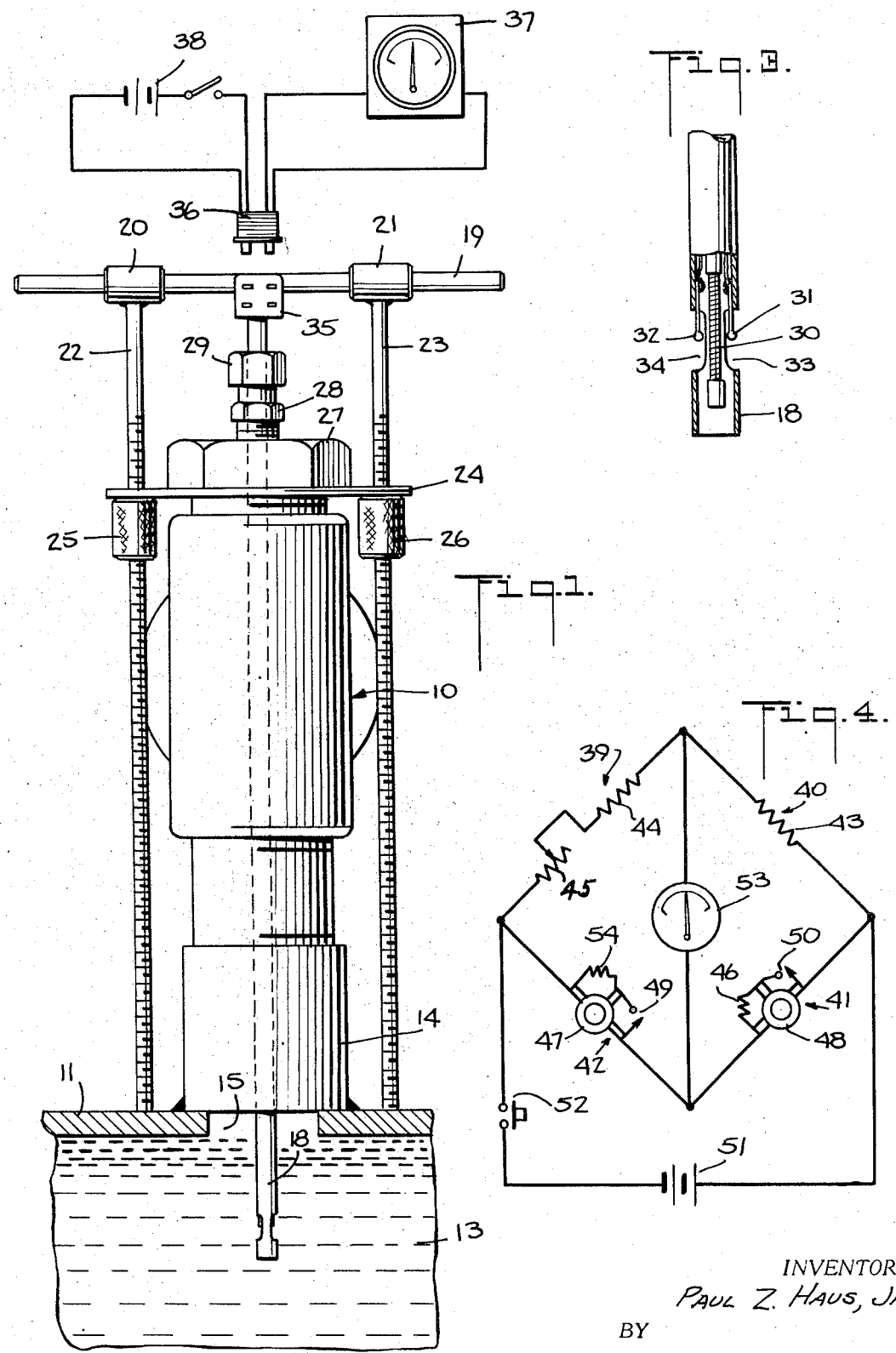
FIGS. 1 and 2 are respectively side elevation and end elevation views, partly in cross-section, of the apparatus of the invention installed on a gate valve secured to the pipe casing of a pipe enclosing a cable or cables.
Figure 2:
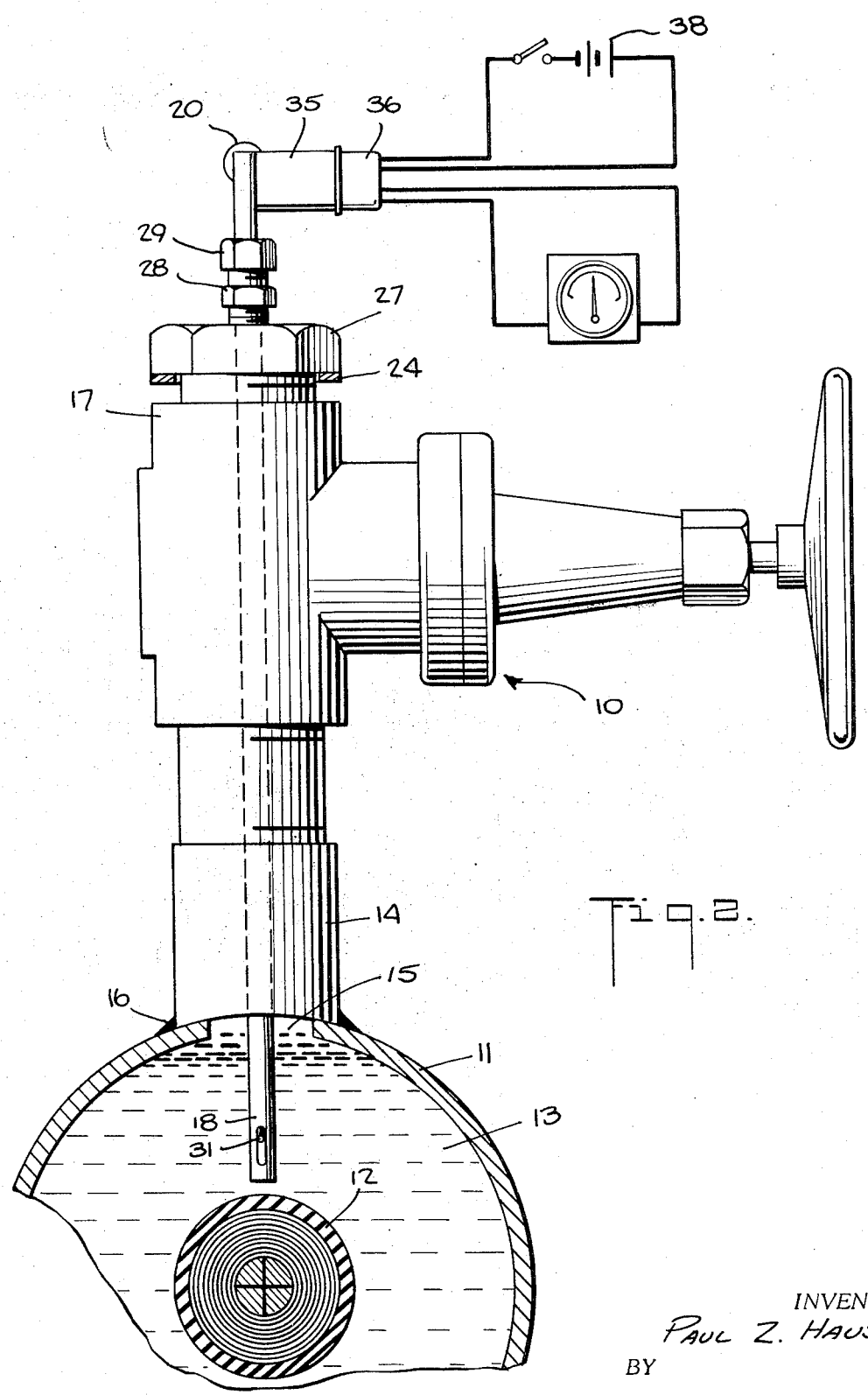

Normally, at the top of each pipe cable joint casing, which is contained in a manhole or other access place, there is a valve, such as the gate valve 10 shown in FIGS. 1 and 2. The valve 10 is secured in fluid type relation to the pipe casing or oil conduit 11 which contains one or more cables or cable cores 12 and is filled with oil 13. The gate valve connecting coupling 14 is over and communicates with an opening 15 in the casing or conduit 11, and is secured to such conduit 11 such as by weld metal 16. The portion 17 of the gate valve 10 normally is open or is closed by a pipe plug (not shown).

The apparatus of the invention comprises a relatively long and narrow probe 18 which may be made of a tube of insulating material, such as phenolic impregnated fiber, or a metal tube, such as a brass tube. A cylindrical tube having an outside diameter of 5/16 inch and a length of 16 inches has been found to be satisfactory for many installations. The probe 18 is secured at its upper end to a rod 19, which is encircled by a pair of collars 20 and 21 having a sliding fit therewith. The collars 20 and 21 are secured to the ends of a pair of threaded rods 22 and 23, which extend through slots in a hold down plate or bearing member 24, and a pair of knurled nuts 25 and 26 are mounted on the threaded portions of the rods 22 and 23 so as to bear against the bearing member 24 and move the probe 18 downwardly, as viewed in FIGS. 1 and 2, when the nuts 25 and 26 are rotated in the direction which moves them upwardly. The rods 22 and 23 act as gauges for the depth of penetration of the probe 18.

Before the probe 18 is installed through a gate valve 10, the bearing member 24, which has a hole therethrough for receiving the threaded portion of a reducing bushing 27, is placed over such threaded portion, and the bushing 27 is turned into the opening in the portion 17 of the valve 10. A fitting, comprising the bushing 28 and the clamping nut 29, encircles the probe 18 near its upper end and when the clamping nut 29 is tightened, it prevents leakage of oil between the clamping nut 29 and the outer wall of the probe 18.

To install the probe 18 on a gate valve 10, the bearing member 24, the bushing 27 and the fitting comprising the bushing 28 and the clamping nut 29, are installed in the positions shown in FIGS. 1 and 2, at the upper portion 17 of the gate valve 10, while the valve 10 is closed. With the clamping nut 29 loosened, the probe 18 is inserted into the opening in the clamping nut 29 and moved downwardly until the lower end thereof is adjacent the bushing 27. The collars 20 and 21, with the rods 22 and 23, are slid over the ends of the rod 19 until the rods are in the slots in the member 24 with the nuts 25 and 26 below the member 24. The clamping nut 29 is partly tightened so that when the gate valve 10 is thereafter opened little oil is lost between the clamping nut 29 and the probe 18, but is not itghtened to the extent that the probe 18 cannot slide with respect thereto. The gate valve 10 is then opened and the free end of the probe 18 is moved downwardly into the interior of the pipe 11 by rotating the nuts 25 and 26. Normally, there is at least 1 inch of space between the interior wall of the conduit 11 and any cables 12 contained within it, and the probe 18 is moved downwards carefully until the free end thereof extends into the interior of the conduit 11 about three-quarters of an inch to 1½ inches. It has been found that if the free end of the probe 18 extends into the interior of the conduit 11 by about 1½ inches, the sensitivity of the measuring apparatus is the highest.

The free end of the probe 18 is shown in greater detail in FIG. 3, and as shown therein, the probe contains an electric heater 30 and a pair of temperature responsive resistors 31 and 32, which resistors may, for example, be thermistors. The electric heater 30 is located co-axially with the probe 18 and the resistors 31 and 32 are spaced from the heater 30 on opposite sides thereof. The probe 18 is cut away at 33 and 34 so as to permit oil within the conduit 11 to flow freely around the resistors 31 and 32 and the heater 30. As pointed out hereinafter, one of the resistors 31 or 32 may be omitted.

Connecting leads for the resistors 31 and 32 and the heater 30 extend lengthwise of the probe 18 in the interior thereof and preferably the interior of the probe 18 is filled with an insulating material, such as an epoxy resin. The connecting leads extend to a socket 35 (FIG. 1) mounted on the rod 19 and the socket 35 receives a plug 36 which connects the resistors 31 and 32 and the heater 30 respectively to a resistance measuring device 37, and a battery or other electrical power source 38.

The resistance measuring device 37 may, for example, be a Wheatstone bridge of the type shown in FIG. 4. In FIG. 4, the bridge comprises a plurality of arms 39–42, the arm 49 comprising a fixed resistor 43 and the arm 39 comprising a fixed resistor 44 and an adjustable resistor 45. One of the other two arms comprises either a fixed resistor 54 or 46, and the other thereof comprises one of the temperature responsive resistors, 31, or 32, or, alternatively, each of the arms 41 and 42 comprises one of the temperature responsive resistors 31 and 32 dependent upon the method employed. The connections to the temperature responsive resistors 31 and 32 are represented by the connectors 47 and 48, and when either of such resistors is omitted, the associated resistor 54 or 46 is connected in the arm by a switch 49 or 40. The bridge is energized from a battery 41 through a switch 52, and the balance and unbalance of the bridge is indicated by a meter 53.

Satisfactory results have been obtained when the component parts have the following values:

Heater 30 — 20 ohm nichrome wire wound resistor
Thermistors 31 & 32 — 1,000 omhs at 25°C.
Resistor 44 – 470 ohms
Resistor 43 — 1,000 ohms
Adjustable resistor 45 — 2,000 ohms
Resistors 46 & 54 — 1,000 ohms
Meter 53 — 100–0–100 microamperes
Battery 51 — 1.5 volts
Battery 38 — 6 volts In the first embodiment of the method of the invention, only a single thermistor 31 is used, and it is connected in the arm 41, the resistor 54 being connected in the arm 42 by the switch 49. The probe 18 is oriented so that the thermistor 31 is on the side of the heater 30 nearer to the source of oil under pressure, and with the plug 36 in the socket 35, the needle of the meter 53 is set to minus 100 by adjusting the resistor 45. The heater 30 is then energized from the battery 38, and it will be found that the meter needle gradually approaches zero and then continues toward plus 100. However, within a period of five to ten minutes the needle stabilizes at some plus value. The meter 53 may be provided with a reading multiplying shunt if it is necessary to read values higher than 100 microamperes.

After the needle is stabilized, the needle is reset to zero, and the probe 18 is rotated 180° by releasing the nuts 25 and 26, removing the rods 22 and 23 and thereafter, turning the probe 18 by means of the rod 19. If necessary, the nut 29 may be loosened slightly and retightened after the probe 18 has been rotated. The meter 53 is then read, and if there is no oil flow the meter reading will remain close to zero, i.e., within about 10 microamperes. However, if there is oil flow, the meter reading will gradually increase in the positive direction until it stabilizes at some higher value within about one minute. Typical values which I have obtained with a 138 kilovolt cable joint and an oil temperature of 70°F prior to heating are as follows:

| No flow | less than | 10 microamperes |
|---|---|---|
| 7 ½ gallons/hour | | 49 " |
| 15 " | | 70 " |
| 30 " | | 103 " |
| 60 " | | 120 " |

Assuming that the source of oil under pressure was to the right of the heater 30, as viewed in FIG. 1, and, during the initial heating of the oil 13, the thermistor 31 was also to the right of the heater 30 and that the thermistor 31 was to the left of the heater 30 after the probe 18 was rotated 180°, the meter reading in excess of about 10 microamperes indicates that the oil was flowing from the right to the left as viewed in FIG. 1. Accordingly, the leak is to the left of the probe 18 as viewed in FIG. 1. The use of a single thermistor 31 has the advantage that a reference temperature above ambient is established.

In a modification of the method of the invention, a pair of thermistors 31 and 32 is employed and the probe 18 is oriented with the thermistor 31 nearer the source of oil under pressure. With the modified method, the procedure is essentially the same as with the first embodiment, except that it is unnecessary to rotate the probe 18 after the readings have stablized. The thermistor 31 is connected in the arm 41 and the thermistor 32 is connected in the arm 42, and the switches 49 and 50 are open. Prior to energizing the heater 30 from the battery 38, the reading of the meter 53 is set to zero by adjusting the resistor 45, and then, the heater 30 is energized from the battery 38. Within a period of a few minutes, the meter reading will become greater than 10 microamperes in the negative direction if there is oil flow from right to left as viewed in FIG. 1 because of the higher temperature and resistance of the thermistor 32.

It will be noted that in both of the foregoing methods the oil is heated and the temperature is measured interiorly of the conduit 11, but I have found that it is also possible to heat the oil and measure its temperature at the exterior surface of the conduit 11 and obtain information as to the direction of the oil flow provided that the oil flow rate is relatively large, i.e., above about 50 gallons per hour and the conduit is relatively level. In this method, a heating element comprising a 2 ohm coil of nichrome wire capable of conducting 10 amperes of current, is wrapped around the conduit 11 like a collar, and temperature sensing devices, either in the form of thermocouples of thermistors, are placed on each side of the heating element at a distance of about 6 inches therefrom. The direction of oil flow is determined by heating and measuring the temperature difference in the manner described in connection with the first two embodiments of the method of the invention.

Although the invention has been described with respect to the detection of the direction of oil flow, the invention may also be used for the detection of the direction of flow of other fluids, such as a gas. Also, the apparatus of the invention employing a pair of thermistors may be permanently installed on a conduit for the monitoring of the fluie flow and/or for operating an alarm.

It will be readily apparent to those skilled in the art that the oil may be heated and the temperature differential may be determined with other known devices without departing from the principles of the invention. However, the embodiments illustrated and described are preferred because of their simplicity and the ease with which they may be used in the field.

What is claimed is:

1. Apparatus for measuring the direction of fluid flow in a conduit containing such fluid under pressure and having an opening providing access to the interior of said conduit and the fluid therein, said apparatus comprising a relatively long and narrow probe having a free end receivable by said opening, an electric heater and at least one temperature responsive resistor mounted on said free end and spaced from each other transversely of the length of said probe and electrical connections for said heater and said resistor in said probe and extending lengthwise thereof.

2. Apparatus as set forth in claim 1, further comprising means for measuring the resistance of said temperature responsive resistor.

3. Apparatus as set forth in claim 2, wherein said resistance measuring means comprises a Wheatstone bridge having, as one arm thereof, said temperature responsive resistor mounted to the other arms of said bridge by a pair of said electrical connections, and means for indicating the balance of said bridge.

4. Apparatus as set forth in claim 1, further comprising a second temperature responsive resistor mounted on said free end on the side of said heater opposite from the side of said heater at which said one temperature responsive resistor is mounted.

5. Apparatus as set forth in claim 4, further comprising means for measuring the resistances of said temperature responsive resistors.

6. Apparatus as set forth in claim 5, wherein said resistance measuring means comprises a Wheatstone bridge having, as a pair of adjacent arms thereof, said temperature responsive resistors connected to the other arms of said bridge by at least three of said electrical connections and means for indicating the balance of said bridge.

7. Apparatus as set forth in claim 1, further comprising means for securing said probe to said conduit in oil-tight, sliding relation and means for adjusting the penetration of said probe into said conduit through said opening.

8. Apparatus for measuring the direction of fluid flow in a conduit containing such fluid under pressure and having an opening providing access to the interior of said conduit and the fluid therein, said apparatus comprising a relatively long and narrow probe having a free end receiveable by said opening, an electric heater and at least one temperature responsive resistor mounted on said free end and spaced from each other transversely to the length of said probe, electrical connections for said heater and said resistor in said probe and extending lengthwise thereof, means for securing said probe to said conduit in oil-tight, sliding relation and means for adjusting the penetration of said probe into said conduit through said opening, said adjusting means comprising at least one threaded rod extending substantially parallel to the length of said probe, means for securing said rod at one portion thereof to said probe for providing conjoint longitudinal movement of said probe and said rod, a bearing member, means for securing said bearing member to said conduit, and an adjusting nut on the threaded portion of said rod and engageable with said bearing member for moving said rod with respect to said bearing member and transversely of the length of said conduit.

9. A method for determining the direction of flow of oil in a conduit containing such oil under pressure which comprises inserting a heater and a temperature sensing device spaced from said heater into said oil through an opening in said conduit with said temperature sensing device spaced from said heater in a first direction longitudinally of said conduit and heating a first portion of said oil with said heater to a temperature above the temperature of second and third portions of said oil adjacent to said first portion and spaced from each other in a direction longitudinally of said conduit, taking the temperature of the oil at the interior of said conduit and at said second portion with said temperature sensing device and then moving said temperature sensing device to the opposite side of said heater so that it is spaced therefrom in a second and opposite direction longitudinally of said conduit and taking the temperature of said third portion and comparing the relative temperatures of the oil at said second and third portions indicated by said sensing device to determine which of said second and third portions has a higher temperature.

* * * * *